United States Patent [19]
Pailles et al.

[11] Patent Number: 5,495,098
[45] Date of Patent: Feb. 27, 1996

[54] SMART CARD UPDATING PROCESS

[75] Inventors: Jean-Claude Pailles, Epron; Eric Depret, Caen; Philippe Hiolle, Hérouville St Clair, all of France

[73] Assignees: France Telecom Etablissement Autonome de Droit Public, Paris; La Poste, Boulogne-Billancourt, both of France

[21] Appl. No.: 220,684

[22] Filed: Mar. 31, 1994

[30] Foreign Application Priority Data

Apr. 16, 1993 [FR] France ................... 93 04515

[51] Int. Cl.$^6$ ............................................. G06K 19/06
[52] U.S. Cl. ...................... 235/492; 235/380; 902/4; 902/26
[58] Field of Search ..................... 235/492, 380; 902/4, 26

[56] References Cited

FOREIGN PATENT DOCUMENTS 2246913  5/1975  European Pat. Off. .
0096599  12/1983  European Pat. Off. .
0152703  8/1985  European Pat. Off. .
0423035  4/1991  European Pat. Off. .

*Primary Examiner*—Donald T. Hajec
*Assistant Examiner*—Jeffrey R. Filipek
*Attorney, Agent, or Firm*—Oblon, Spivak, McClelland, Maier & Neustadt

[57] ABSTRACT

Smart card payment process.

The card in particular contains an irreversible counter, a balance and a certificate proving the integrity of the preceding informations. The content of the card can only be updated by terminals knowing, the calculation secrets of the certificate. By means of the irreversible counter which intervenes in the calculation of the certificate, it is not possible to reload into the card a prior content (balance/certificate), because such a reloading requires the incrementation of the counter, which renders null and void the prior certificate.

4 Claims, 1 Drawing Sheet

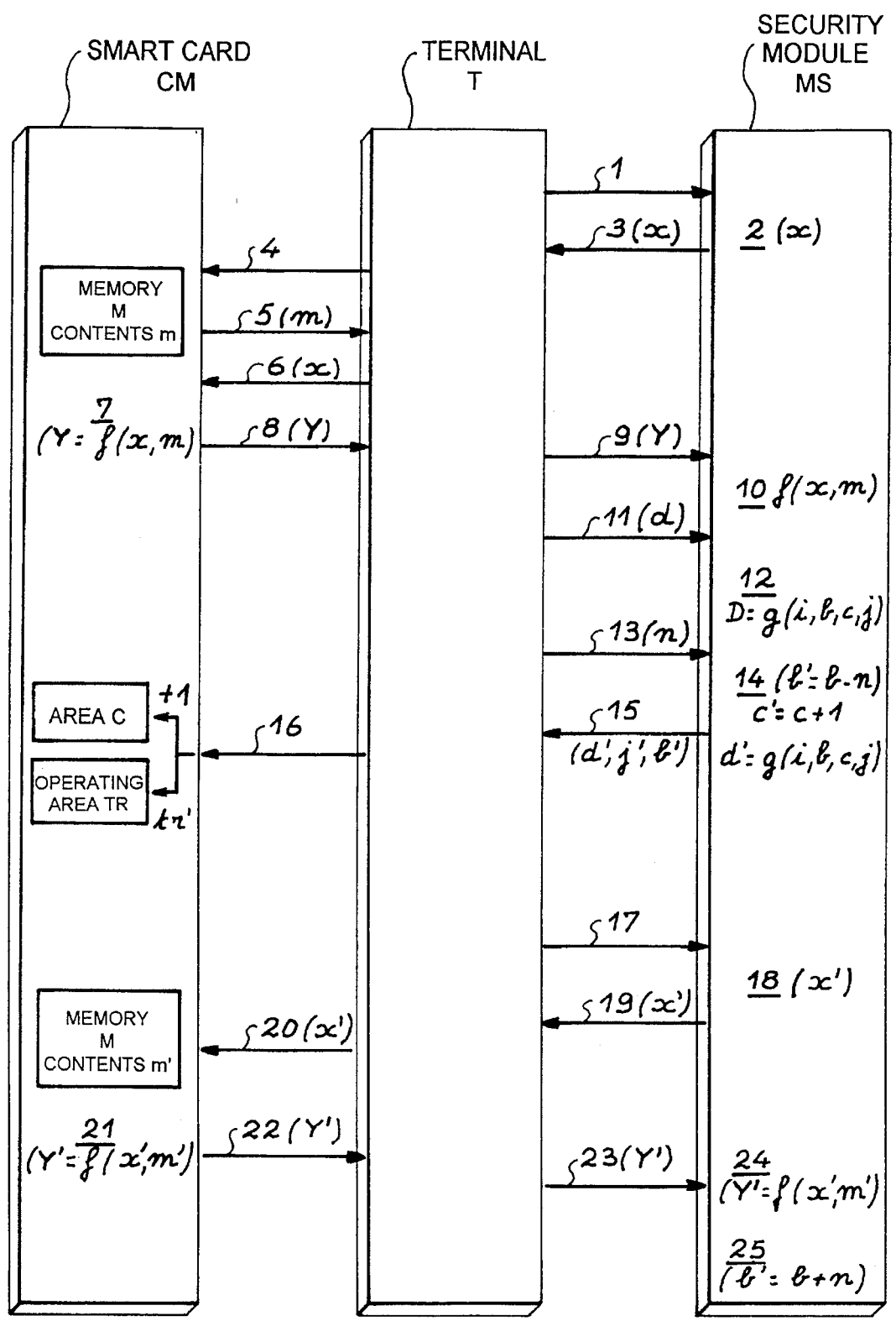

5,495,098

SMART CARD UPDATING PROCESS

TECHNICAL FIELD

The present invention relates to a process for updating a smart card. It is used in the so-called plastic money field and more particularly in so-called open prepayment systems. This is used for designating systems involving a plastic money issuing organization, users having cards preloaded by the issuing organization and terminals able to provide certain services, debit the cards as a function of this and collect the amounts from several cards. The organization owning these terminals is paid by the issuing organization as a function of the number of units which it has collected. The "open" character of certain of these systems is due to the fact that the issuing organization is not necessarily the same as the organization owning the terminals.

If the invention is more particularly applicable to such systems, because it makes it possible to solve certain problems linked with the "open" character, it is not limited to these systems alone and could also be applied to closed systems, where the issuing organization also owns the terminals.

PRIOR ART

As in all portable card systems, prepayment cards give rise to security problems. This problem is even more acute in the case of open systems where terminals must be able to prove to the issuing organization the authenticity of the amounts which have been collected. To this end, each terminal must be equipped with a security module.

These security problems will become more apparent from the following summary of the fraud risks which must be avoided:

Risk a): modification of exchanged data:

It must not be possible, by interposing data processing devices between a card and a security module, to modify the transmitted data so as to e.g. credit a security module with more units than it has debited from the card.

Risk b): reuse of exchanged data:

It must not be possible to repeat data exchanges, e.g. in order to credit several times the same security module on the basis of a single debit from a card.

Risk c): interposing another security module:

It must not be possible to interpose a second security module and credit the two security modules on the basis of a single debit from a card.

Risk d): modification of the content of a card:

It must not be possible to modify the content of a card in order to illegally increase its purchasing power.

All these problems can be solved by the introduction into the card of a microprocessor able to carry out checks, data scrambling, signature authentification, etc.

This solution is satisfactory in certain respects. However, it suffers from the disadvantage of being expensive, because it makes it necessary to introduce a microprocessor into each card.

EP-A-423 035 discloses a system of payment or transfer of informations by an electronic, money-holding smart card, which avoids the use of a microprocessor. This system has various storage areas, whereof one area contains the identity of the owner, one area contains a certificate, one area contains a counter, one area contains a balance and one area contains a secret code.

The counter counts the number of financial operations performed with the card. The certificate is a function of the identity of the owner, the counter content and the balance.

This system does not perfectly solve the security problems, in the sense that it cannot avoid the possibility of creating false money. Thus, the storage areas containing the certificate and the balance can be erased and written without there being any constraint. Therefore there is nothing to prevent the debiting of e.g. ten units from a money-holding card and crediting two terminals with ten units, which would have created 10 false money units.

The object of the present invention is to obviate this disadvantage.

DESCRIPTION OF THE INVENTION

The present invention adopts certain of the operations disclosed by the citation (incrementation of a counter, formation of a certificate) but it adds thereto operations preventing any risk of creating false money. For this purpose, the calculation of the certificate takes account of the identity of the security module, so that two certificates calculated by two different *terminals for the same money-holding card and for the same transaction would necessarily be different. Moreover, in order to erase the certificate and rewrite it, it would be necessary to increment the counter. Finally, the terminals authenticate the money-holding card and its content before and after the transaction.

More specifically, the present invention relates to a process for updating an information (tr) contained in a part (Tr) of a memory (M) contained in a smart card (CM), with the aid of a terminal (T) equipped with a security module (MS), the memory (M) containing a counter area (C), the content of the part (Tr) of the memory (M) to be updated having a certificate (d) contained in an area (D) of the part (Tr), said certificate being a given function (g) of the identity (i) of the card, a balance (b) contained in another area (B) and the content (c) of the counter area (C), said process comprising incrementing by one unit the content (c) of the counter zone (C) prior to any updating of the part (Tr) and erasing the old content (tr) of the part (Tr) of the memory (M) and entering in its place a new updated content (tr'), said process being characterized in that the certificate (d) is also a function of the identity (j) of the security module (MS) having performed the final update, in order to erase the certificate contained in the area (D) and rewrite the updated certificate, the counting area (C) is incremented and the terminal (T) authenticates the card (CM) and its content (m) before and after updating.

The cards can be authenticated by means of a challenge-response process, which is of a conventional nature in data processing security. The terminal supplies to the card a challenge x, which is generally chosen in a random manner or different from the values already used. The card calculates a function Y=f(x,m), in which m represents the content of its memory. The terminal can then be sure that the card is authentic, as well as its content by carrying out the same calculation in order to check Y. In order that said procedure cannot be imitated, it is necessary for there to be a secret somewhere, e.g. the memory can contain a code, which cannot be read from the outside, but which the terminal or computer connected thereto knows or knows how to reconstitute. Thus, the terminal can authenticate the card and its content.

Preferably, the balance (b) contained in the area (B) is a financial balance, the process then being a payment process corresponding to a service.

In order to prevent any possibility of returning backwards (changing b', d' into b,d), which would have the effect of erasing the final expenditure, a "ratchet" mechanism is implemented by means of the memory area C. The card incorporates means such that the content of the area C must be incremented prior to the updating of the areas B, D and J, (which requires a preerasing of said areas). The area C is an area which, initially, can be at zero, and in which bits can be simply written, but not erased.

The calculation of the certificate d takes into account the value c of this counter. Thus, the modification of (b',d') to (b,d) is not possible without incrementing c. However, then the certificate d is no longer correct, because it is calculated with the preceding c.

The calculation of the certificate d must also take account of the number j of the security module, so as to link, during a transaction, a card with a particular security module and avoid the fraud of type c, as described hereinbefore.

When the process according to the invention is a payment process, it preferably involves the following operations:

a) checking that a certificate (d) contained in an area (D) of the part (Tr) of the card is indeed a given function (g) of the identity of the card (i), its balance (b), the content (c) of a storage area (C) serving as the counter, and the identity (J) of the final security module having performed the last transaction;

b) calculating, in the security module (MS), a new balance (b') differing from the old balance (b) by a certain number of units (n), corresponding to a service;

c) calculating, in the security module (MS), a content of the counter (c') equal to the old content (c) increased by one unit (c'=c+1);

d) calculating a new certificate (d') equal to said function (g) of the identity of the card (i), the new balance (b'), the new content (c') of the counter and the identity (j ') of the security module (MS);

e) incrementing by one unit the content (c) of the storage area (C) of the card serving as the counter (c'=c+1);

f) if and only if said content (c') has in fact been incremented is it possible to erase the part (Tr) of its old content (tr) constituted by the old balance (b), the old certificate (d) and the old identity (j) of the final security module used and write there in its place a new content (tr') constituted by the new balance (b'), the new certificate (d') and the identity (j') of the security module of the terminal;

g) authenticate by the security module (MS) the card (CM) and at least the identity (j) of the new content (tr') of the area (Tr);

h) in the case of authenticity, modify the balance (s) of the security module by the quantity (n) corresponding to the modification of the balance of the card (s'=s+n).

This process makes it possible to avoid the risks defined hereinbefore, namely and respectively:

risk a): the security module authenticates the card at the start of the transaction and after updating the data written in the card; so that it is not possible to modify the transmitted data;

risk b): the security module authenticates the card before and after the transaction and chooses the challenges; it cannot therefore be subject once again to the data of a first exchange as such;

risk c): if the transaction had to take place between two different security modules, i.e. of different identities respectively j1 and j2, it would be necessary for a same value c of the counter area C, to enter two different data series, one T1 relative to j1 and the other T2 relative to j2; but in order to erase T1 in order write T2, it would be necessary to increment the content of the counter area C, which would render T2 invalid, so that it is not possible to credit two security modules from the same debit affecting a single card;

risk d): it is not possible to modify the balance b because the certificate d is dependent in secret manner on the balance b, so that it is impossible to find the corresponding value of d and a false value would be detected during the following transaction; in order to restore the card to a prior state, it would therefore be necessary to erase its content c, which would involve incrementing the content of the counter C and the old values of the certificate d would then be incorrect, so that the security module involved in the transaction would detect it and the card would no longer be usable.

BRIEF DESCRIPTION OF THE DRAWINGS

The long FIGURE depicts the Smart Card Cm, Terminal T, Security Module MS and the corresponding data signals.

DETAILED DESCRIPTION OF AN EMBODIMENT

A description will now be given of a detailed procedure for the exchange of transactions and data between a smart card, a terminal and its security module. The capital letters designate the storage areas, whereas the corresponding small letters designate the content of these areas. The smart card is designated CM and its identity is i. The terminal is designated T. The security module in operation is designated MS and its identity is designated j', knowing that that of the module which performed the preceding transaction was j.

The operations involved are shown in the corresponding Figure as reference numerals 1–25, which correspond to the steps as follows:

1. T asks MS to choose a random variable,

2. MS chooses and stores a random variable, namely x,

3. MS transmits x to T,

4. T requests CM to read the content m of the memory M,

5. CM reads M and transmits m to T,

6. T requests CM to authenticate itself with the aid of the random variable x,

7. CM calculates Y=f(m,x),

8. CM transmits Y to T,

9. T transmits Y and m to MS,

10. MS calculates f(x,m) and checks that Y is indeed equal to f(x,m),

11. T asks MS to check the certificate d,

12. MS calculates D=g(i,b,c,j),

13. T communicates to MS the debit to be made n,

14. MS calculates the new value of the balance b'=b-n increments c by c'=c+1 and calculates d'=g(i,b',c',j'), 15. MS transmits to T the updates d', j', b', 16. T asks CM to write a 1 in the area C, to erase the content tr of the operating area Tr, to write there the new content tr' formed by j', b', d', 17. T asks MS to choose a new random variable, 18. MS chooses and stores a random variable x', 19. MS addresses x' to T, 20. T requests CM to authenticate itself with its new content m', 21. CM calculates Y'=f(x',m'), 22. CM transmits to T the value of Y', 23. T asks MS to check the authenticity of Y', 24. MS checks that m' corresponds to i', c', j', b', d' and checks that Y'=f(x',m'), 25. if the verification is positive, MS increases its balance by n.

The preceding operations lead to a reduction of the balance of the card and to the increase of the amount collected by the terminal. It is obvious that the same sequence of operations can be used for reloading a card and increasing its balance, whilst decreasing by the same amount a reloading terminal.

In the above examples, (m) represents the content of the data in the card (CM). However, it is also possible to not incorporate into (m) the data of the certificate (d) and the data of the balance (b). Thus, these data can be indirectly authenticated by the fact that Y is a function in particular of (j), which can simplify implementation.

We claim:

1. Process for updating an information (tr) contained in a part (Tr) of a memory (M) contained in a smart card (CM), with the aid of a terminal (T) equipped with a security module (MS), the memory (M) containing a counter area (C), the content of the part (Tr) of the memory (M) to be updated having a certificate (d) contained in an area (D) of the part (Tr), said certificate being a given function (g) of the identity (i) of the card, a balance (b) contained in another area (B) and the content (c) of the counter area (C), said process comprising incrementing by one unit the content (c) of the counter zone (C) prior to any updating of the part (Tr) and erasing the old content (tr) of the part (Tr) of the memory (M) and entering in its place a new updated content (tr'), said process being characterized in that the certificate (d) is also a function of the identity (j) of the security module (MS) having performed the preceding update, in order to erase the certificate (d) contained in the area (D) and rewrite the updated certificate (d'), the content (c) of the counting area (C) is incremented and the terminal (T) authenticates the card (CM) and its content (m) of the card before and after updating.

2. Process according to claim 1, wherein the balance (b) contained in the area (B) is a financial balance, the process then being a payment process corresponding to a service.

3. Process according to claim 2, wherein it further comprises the steps of:

a) checking that a certificate (d) contained in an area (D) of the part (Tr) of the card is indeed a given function (g) of the identity of the card (i), its balance (b), the content (c) of a storage area (C) serving as the counter, and the identity (j) of the security module which performed the preceding transaction;

b) calculating, in the security module (MS), a new balance (b') differing from the old balance (b) by a certain number of units (n), corresponding to a service;

c) calculating, in the security module (MS), a content of the counter (c') equal to the old content (c) increased by one unit (c'=c+1);

d) calculating in a new certificate (d') equal to said function (g) of the identity of the card (i), the new balance (b'), the new content (c') of the counter and the identity (j') of the security module (MS);

e) incrementing by one unit the content (c) of the storage area (C) of the card serving as the counter (c'=c+1);

f) if and only if said content (c') has in fact been incremented is it possible to erase the part (Tr) of its old content (tr) constituted by the old balance (b), the old certificate (d) and the old identity (j) of the preceding security module used and write there in its place a new content (tr') constituted by the new balance (b'), the new certificate (d') and the identity (j') of the security module of the terminal;

g) authenticate by the security module (MS) the card (CM) and at least the identity (j) of the new content (tr') of the area (Tr);

h) in the case of authenticity, modify the balance (s) of the security module by the quantity (n) corresponding to the modification of the balance of the card (s'=s+n).

4. Process according to claim 3, wherein, in order to authenticate a card (CM) during its introduction into a terminal (T):

the security module (MS) chooses and stores a random variable (x) and the address at the terminal (T), the terminal (T) addresses said random variable (x) to the card (CM), the card (CM) reads the content (m) of its memory (M) and the address at the terminal (T), the security module (MS) calculates a function Y=f(x, m) of the random variable (x) and the content (m) of the memory (M), the card calculates a function Y=f(m,x) of its content (m) and the random variable (x) received and addresses this function (Y) to the terminal, the security module (MS) tests that the result of the function (Y) received from the card is indeed identical to the result of the function which it has calculated.

* * * * *